Patented Jan. 12, 1937

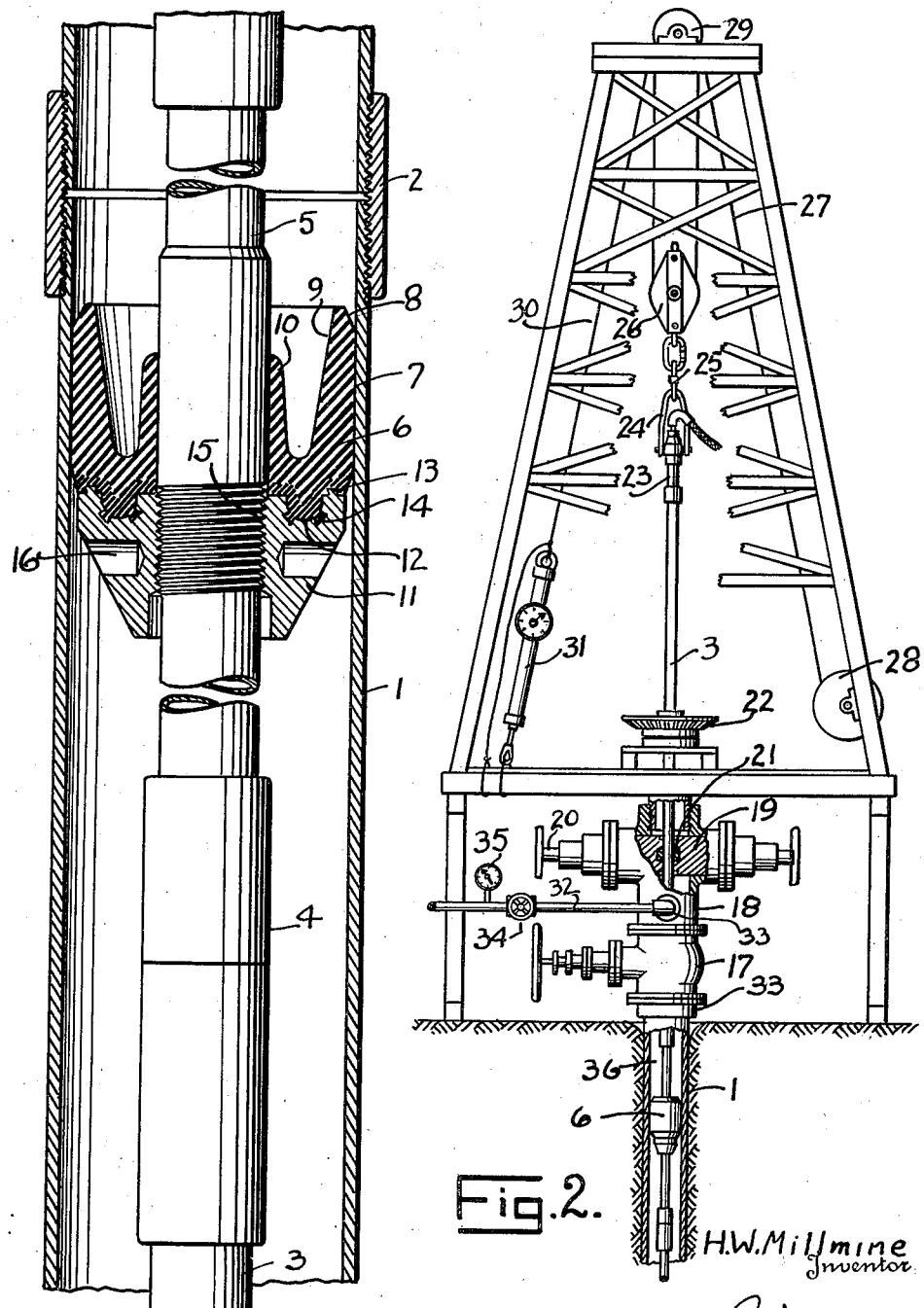

2,067,499

UNITED STATES PATENT OFFICE 2,067,499

TESTING DEVICE FOR WELL EQUIPMENT

Herbert William Millmine, Houston, Tex.

Application January 18, 1936, Serial No. 59,687

8 Claims. (Cl. 255—1)

My invention relates to an apparatus whereby various parts of the apparatus employed in drilling wells may be tested.

During the drilling of wells, particularly in wells where gas pressure is encountered, it is important to have blowout preventers, master valves and other types of safety devices which may be kept continuously in efficient condition, so that if they are needed to cut off the escape of gas from the well they will be in such condition as to efficiently perform the service for which they were designed. These pieces of apparatus are placed upon the well and are there while the drilling is going on. They may be tested before they are placed in position but due to shocks and vibration in use they may become ineffective so that when high pressures are encountered and a dangerous blowout is imminent, they are not tight and will not effectively perform their duty.

Also there are other parts of the equipment about the well employed in drilling such as the cable, the derrick, crown block and swivel, which must be strong and in proper condition to withstand heavy loads.

It is an object of my invention to provide a device whereby the various parts of the apparatus employed in drilling, including the casing itself, valves, blowout preventers, and other fittings on the well, together with the derrick, the cable, the crown and traveling blocks, may all be tested to ascertain their condition and to determine what amount of load they can safely carry.

It is a further object to provide a device which is adapted to be placed upon the drill stem or other pipe extending into the well which may seal off the passage of fluid downwardly in the well and entrap pressure fluid above said device so that tests may be made of the apparatus above the same.

It is desired to provide a device of this kind which can be readily connected upon the interior pipe or drill stem and employed when desired for the purpose of making such tests as are desired.

It is a further object to so mount the device upon the drill stem that a downward pull upon the drill stem may be exerted so as to determine the effective load which the derrick, cable and other parts of the drilling apparatus may be tested.

The various uses to which my device may be put will be more clearly understood in connection with the drawing and explanation thereof which follows:

In the drawing herewith, Fig. 1 is a central longitudinal section through a well casing having a drill stem therein equipped with my invention.

Fig. 2 is a side view largely diagrammatic illustrating the manner in which my device may be employed for testing the well equipment.

My device is designed to be employed within a well casing 1, said casing being made up of sections connected together at their adjoining ends by couplings 2.

I mount my testing device upon a section of concentric pipe within a casing. Preferably this device is connected into a drill stem 3 having tool joints 4 thereon. I mount the device upon a short section of pipe indicated at 5, the ends of which are threaded for engagement with the tool joints of the drill stem.

Upon this section 5 of pipe I mount a packing cup 6 which is made up of compressible packing material such as rubber or similar composition. This cup is cylindrical at 7 on its outer periphery, the upper end being beveled at 8 to more effectively pass the couplings in the casing. The inner wall of the packing member is inclined downwardly and inwardly at 9 to a point spaced from the lower end, there being an inner lip 10 formed on the cup to bear against the outer wall of section 5 of pipe.

The cup 6 is mounted upon a metallic base 11. Said base has its upper end formed with an annular recess 12 spaced from its outer and inner margins. The upper face is also provided with a projecting ridge 13, which is dovetailed in cross section so as to better anchor the packing cup upon the base. The walls of the recess 12 are also formed with grooves so formed therein as to serve to better anchor the rubber of the packing cup thereto. The said cup 6 is made of hard rubber adjacent the base 11, this harder quality of rubber being indicated by the finer section lines as shown at 14. The hard rubber thus serves to better attach itself to the metal and to form an anchor for the more pliable upper portion of the cup.

The inner portion of the base 11 is threaded at 15 to be screwed upon the pipe section 5. There are radial openings 16 therein to receive a wrench or rod whereby the base may be screwed upon the drill stem.

When the packing member has been mounted upon the pipe 5 as thus shown it may be connected into the drill stem for use at any time when a test is desired.

In Fig. 2 I have shown the casing 1 as having at the upper end thereof certain safety devices such as are ordinarily employed. A master valve 17 is connected within the casing and above this valve is a blowout preventer 18 of ordinary construction, said blowout preventer having inner rams 19 which are advanced to and from position engaging the pipe by threaded shafts 20. These rams may close about the drill stem and the packing 21 on the forward faces of the rams tends to preserve a seal, preventing the leakage of pressure fluid upwardly past the rams and outside the drill stem 3.

The drill stem is rotated by the usual rotary shown diagrammatically at 22 and the drill stem 3 extends downwardly through this table and is adapted to be rotated thereby. The upper section of the drill stem, ordinarily called the kelly joint, is connected to the swivel 23 which is supported by means of a bail 24 thereon and a hook 25 with the traveling block 26.

The traveling block is supported in the derrick by the usual cable 27 passing from the hoisting drum 28 upwardly over the crown block 29 and around the traveling block 26. The dead line from the cable is extended downwardly at 30 and secured to the sills of the derrick.

Connecting in this dead line is a weight indicator of any desired construction, a common example of which is shown at 31. This weight indicator is employed to indicate the load carried by the cable.

In order that various tests may be made with my testing device I connect a pipe 32 with the upper end of the casing below the blowout preventer 18 or other similar safety device, as shown at 33. This pipe is connected with a source of pressure fluid which may be either liquid or gas, but preferably a liquid. This liquid may be forced through the pipe 32 into the casing above the packer cup 6 to determine whether there are leaks in the apparatus. I have a control valve 34 in this line and a pressure gauge 35 may also be employed.

When a test is to be made my packer member is mounted upon the drill stem, as shown particularly in Fig. 2, and the drill stem is then lowered to position the packing member at a point below the safety device 18. If the valve 17 is to be tested the packing member 6 is reversed in position and is located above the valve. Pressure fluid forced into the casing above the valve may not pass upwardly and will be trapped between the valve and packer. If the valve is not tight, leakage may be noted.

In like manner the valve 17 may be opened, the blowout preventer closed and, with the packing cup in erect position, as shown in Fig. 2, the pressure again turned on to note in a similar manner whether there is leakage about the blowout preventer. It will be obvious that any safety devices which tend to control the upper end of the well may be similarly tested with the device. The packer 6 will prevent passage of fluid downwardly in the well and make it possible to provide a pressure space at 36 in which I maintain pressures similar in all respects to the pressure which may be encountered in case of a possible blowout.

It is further to be noted that when the pressure is introduced into the space 36 above the packer that a downward force will be exerted against the packer which tends to move the drill stem downwardly in the casing. This will exert a strong pull on the drill stem which will be resisted by the cable and the hoisting apparatus connected therewith. It will be possible by means of the pressure gauge 35 to note the number of pounds pressure exerted by the fluid within the casing. It will also be possible by means of the weight indicator 31 to note the pull upon the cable. With these two means of observing the effects of the pressure against the packing member 6 it will be possible to place loads upon the derrick and upon the cable and other apparatus and note to what extent the drill stem suspending means will withstand loads which may be placed thereon. Hence it is possible by this means to test the cable, the derrick, the crown block and the traveling block and other parts connected with the drill stem suspending devices.

It is also possible by means of my device to test the casing to see whether leaks have developed in the casing itself. Such tests frequently have to be made and my device furnishes a most efficient means for so doing. The packing member may be mounted at the lower end of the drill stem and drill stem may then be lowered downwardly into the well and at various positions along the length of the casing tests may be made. If leaks are observed at any one of these tests the position in the casing of the leak may be quite accurately determined by various adjustments of the packer vertically in the well and repeated tests so that if a leak develops its position may be very accurately ascertained. It will be seen with reference to Fig. 1, for example, that if a leak developed around the coupling 2, if the pressure was confined above the packing member 6, there would be an escape of pressure fluid around the joint and by noting the distance of the packing member from the upper end of the well the exact position of the leak could thereby be determined.

It will be understood that my device is capable of being used for various tests about the well equipment and will furnish a valuable accessory for use with drilling rigs to make such tests as are necessary. The device is cheaply made and easily and quickly mounted on the drill stem for testing purposes and will enable the driller to determine whether or not imperfections in his apparatus exist at any time.

What is claimed as new is:

1. In well equipment including a well casing, a blowout preventer thereon, a drill stem extending through said blowout preventer into said casing, and means to introduce fluid pressure into said casing below said blowout preventer; the combination of a packer on said drill stem below said means to close the casing against the passage of pressure fluid downwardly therein, so that pressure fluid entering the casing below said blowout preventer will be trapped between said preventer and said packer.

2. In combination with a well casing, an inner pipe extending downwardly in said casing, means adjacent the upper end of said casing to close said casing against the escape of fluid between said casing and pipe, means to seal between said pipe and casing at a point spaced below said closing means, and means to introduce fluid under pressure between said closing means and said sealing means.

3. In a well equipment, a well casing, a drill stem in said casing, means to introduce pressure fluid into said casing at a point below the upper end thereof, means secured to said drill stem and responsive to fluid pressure to seal between the casing and drill stem below said first named means and sustain the force of said pressure fluid, means to seal said casing above said pressure fluid introducing means, and means to support said drill stem and said lower sealing means and prevent downward movement of said drill stem when said fluid pressure is effective.

4. In a well equipment, a well casing, a drill stem in said casing, means to introduce pressure fluid into said casing at a point below the upper end thereof, means secured to said drill stem to seal between the casing and drill stem below said first named means and sustain the force of said pressure fluid, means to seal said casing above said pressure fluid introducing means, means to support said drill stem and said lower sealing means and prevent downward movement of said drill stem when said fluid pressure is effective.

5. In a well head equipment, a well casing, a drill stem in said casing, means to introduce pressure fluid into said casing at a point below the upper end thereof, means secured to said drill stem and responsive to fluid pressure to seal between the casing and drill stem below said first named means and sustain the force of said pressure fluid, means to seal said casing above said pressure fluid introducing means, means to support said drill stem and said lower sealing means, and prevent downward movement of said drill stem when said fluid pressure is effective, and means to measure the downward force of said pressure fluid upon said drill stem and lower sealing means.

6. A well casing, a drill stem therein, means to support said drill stem, a sealing member on said drill stem in said casing to prevent the passage of fluid downwardly in said casing outside said drill stem, means to close the upper end of said casing about said drill stem, means to introduce fluid under pressure between said closing means and said member to exert a downward force upon said drill stem and said supporting means and means to measure said force.

7. A method of testing leaks in well casing and sealing members thereon including introducing a sealing member into the casing below the point to be tested, closing the upper end of the casing and introducing fluid under pressure into the casing between said sealing member and the closed upper end of the casing and noting the escape of said fluid.

8. A method of testing equipment in wells equipped with well casing and closure members thereon including introducing an inner pipe into the well casing, sealing between said pipe and the casing below the upper end of the well, sealing the upper end of the well about said pipe, and introducing pressure between the closed upper end of the well casing and said seal and thereby exerting a downward force upon said seal and said pipe.

HERBERT WILLIAM MILLMINE.